United States Patent [19]
Nilsen, Jr.

[11] 3,941,094
[45] Mar. 2, 1976

[54] WATERER VALVE ACTUATOR-FLOAT

[76] Inventor: Norman P. Nilsen, Jr., P.O. Box 33, Phelan, Calif. 92371

[22] Filed: Dec. 15, 1971

[21] Appl. No.: 208,270

[52] U.S. Cl. .................................. 119/80; 119/75
[51] Int. Cl.² ............................................ A01K 7/02
[58] Field of Search ................ 119/72.5, 78, 75, 80

[56] References Cited
UNITED STATES PATENTS

| | | |
|---|---|---|
| 1,259,791 | 3/1918 | Simmons ....................... 119/80 UX |
| 1,982,062 | 11/1934 | Matthews ....................... 119/80 UX |
| 2,921,556 | 1/1960 | Nilsen .............................. 119/80 X |
| 3,505,978 | 4/1970 | Nilsen ................................. 119/75 |

Primary Examiner—Hugh R. Chamblee

[57] ABSTRACT

An actuator-float for animal operation and automatically lifting and thereby closing the valve of a waterer cup, or the like, when filled to a predetermined level, and particularly adapted to animal waterer systems wherein water pressure is relied upon for maintaining the normally closed condition of said valves.

1 Claim, 5 Drawing Figures

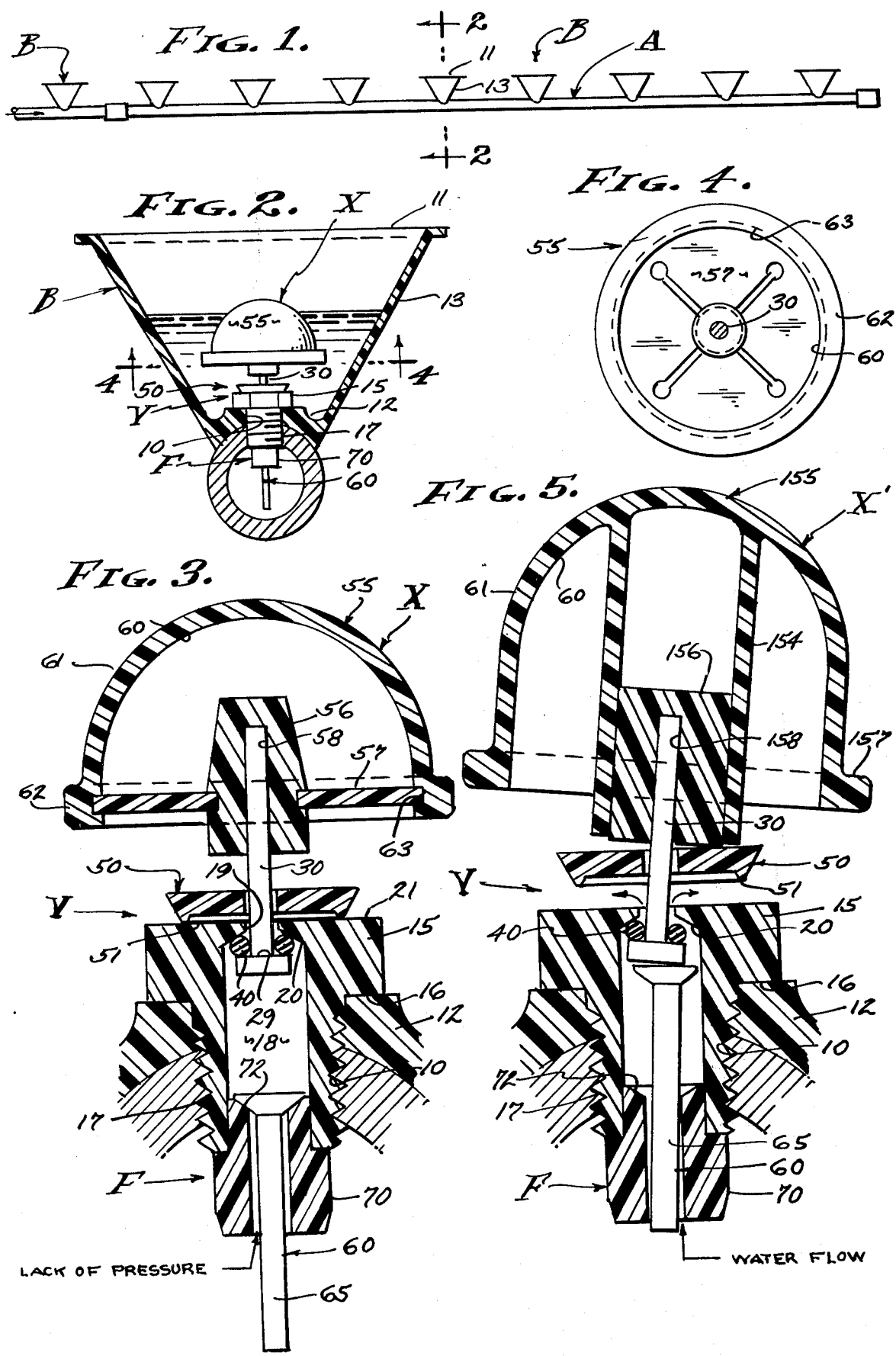

WATERER VALVE ACTUATOR-FLOAT

BACKGROUND

The watering of fowl and other animals involves waterers of advanced design immediately responsive to demands of the animal without excessive release of water. Such systems are operated at low pressures and a typical system involves a multiplicity (hundreds—thousands) of individual waterer cups and each with its control valve. Valve controlled waterer cups of the type under consideration are self-cleaning by utilizing the animal habits to advantage in cooperation with the waterer structure; and in general such systems are highly satisfactory. However, the water pressure is relied upon for effecting the normal valve closures and in the event of total loss of pressure in the water supply, difficulties arise in reinstating system operation. That is, extensive waterer systems will not build up sufficient pressure in the relatively short length of time required before flooding will occur, and in some instances might never build up pressure because of the total open condition. Therefore, in the event of a catastrophe or power failure due to storms, etc. and beyond human control, extensive waterer systems of the type under consideration must be shut down and restarted, and all of which is time consuming and can occur when man power is not available. Therefore, it is an object of this invention to provide means by which each individual waterer is protected against flooding by providing a float control for the valve thereof.

FIELD OF INVENTION

From the foregoing and with the aformentioned idea of means as the solution thereof, it must be borne in mind that fowl and the like are rather small animals that are raised in multitudes and that the waterers therefore are correspondingly small and employed in great numbers. Therefore, the valves controlling the waterer cups are minute and the smallness of the cups cannot be encumbered in any way detrimental to feeding. In this respect the state of the art includes valve controlled waterer cups which include backflow preventors and discharge cleaners, and all of which is related to the cup configuration and normal water level therein coordinated with the animal feeding habits. In practice, each waterer cup and valve has an actuator especially adapted to be operated by the animal to open the valve and thereby supply water on demand. Consequently, a large float mechanism that would interfere with the said actuator cannot be tolerated and it is to this end that an object of this invention is to provide an actuator-float which is effectively small and located where it does not interfere with drinking.

Further, floats must be bouyant in order to be effective, and either solid or hollow floats are sinkable, there being the liklihood of water logging or leaking. Still further, there is an extensive use of plastics in fabricating such waterers, and a plastic float assembly indestructible by the fowl is a requirement. To these ends therefore, it is an object of this invention to provide a substantially indestructible non-sinkable actuator-float of plastic material for the purposes hereinabove set forth and which is readily adapted to waterer units as they are presently manufactured. With the present invention continued use of the waterer is not detrimental to the actuator-float hereinabove described, and in the event of subsiding water pressure and a depression of the water level the float, by virtue of its configuration, is emptied of water and its floatation capability renewed.

SUMMARY OF INVENTION

This invention relates to a valve actuator-float for animal waterers and the like and provides therefor a positive shut-off of the water supply thereto. The principles of floatation are employed and the invention resides in a unique actuator-float X that functions to admit water and to limit the water level within each waterer unit regardless of the pressure potential in the existing water supply. Normally, it is the said pressure potential which serves to maintain valve closure, with a valve actuator exposed to the animal for momentary operation through opening of said valve. Waterers in which the actuator-float X is combined are provided to be used in large numbers applied onto manifold pipes A. In practice, the manifold pipes A and waterer units B are associated with poultry pens, cages and yards wherein different levels are involved and there are variations in water pressures. The operative water pressures normally vary from 4 to 16 lbs. per square inch, and regardless of any pressure changes it is required that the waterers each maintain a constant normal level therein. Each waterer unit B is complete and operative in itself when applied to the manifold A to have its complete range of functions and at each waterer unit B there is a shut-off valve V operable by the natural habits and instinctive actions of the poultry, and there is a check valve filter F. In practice the manifold A is comprised of a pipe with like or identical and equally spaced upwardly faced openings 10 displaced in a common plane. The waterer units B are threaded into said openings and each is equipped with the actuator-float X which is effective to prevent flooding regardless of water pressure fluctuations.

DRAWINGS

The various objects and features of this invention will be fully understood from the following detailed description of the typical preferred form and application thereof, throughout which description reference is made to the accompanying drawings, in which:

FIG. 1 is an elevational view showing waterers as they are installed upon a manifold.

FIG. 2 is an enlarged sectional view showing the actuator-float combined with the waterer and taken as indicated by line 2—2 on FIG. 1.

FIG. 3 is an enlarged section of the combined waterer valve and actuator-float, advantageously utilizing the prior art actuator.

FIG. 4 is a view showing the actuator and float combination of and taken as indicated by line 4—4 on FIG. 2.

FIG. 5 is a view similar to FIG. 3 illustrating a second embodiment of the combined actuator-float of the present invention.

PREFERRED EMBODIMENT

Referring now to the drawings, the actuator-float X as best illustrated in FIG. 2, is an inverted chamber that opens downwardly so as to entrap a volume of air sufficient for floatation of the shut-off valve V and involves an actuator body that enables the animal to pivot the valve V for its actuation with consequent release of water on demand.

The cups at each waterer unit B are alike or identical and are provided to receive and to dispense water from the manifold A, and each is a vertically disposed vessel-shaped part open at its top 11 and provided with a ported bottom 12 concaved for engagement on and in communication with the manifold. The cup is a cone-shaped part with outwardly flared side walls 13 that terminate at the top 11, the top being in the form of a flat horizontally disposed peripheral flange. In practice, the top 11 is approximately three inches in diameter and tapers inwardly toward the bottom 12 approximately one inch in diameter. This particular configuration has been found to be successful in serving chickens, the cup being a molded plastic material or the like.

The shut-off valve V couples the cup of the waterer unit B to the manifold A and in controlled communication with the interior of said manifold. The valve V has a body 15 in the nature of a coupler having a shoulder 16 to clamp downwardly upon the top side of the bottom 12, and having a threaded depended cylindrical wall 17 threadedly engaged with the opening 10. Thus, the valve body 15 clamps the cup in working position on the top side of the manifold pipe, with sealed engagement by virtue of the plasticity in said body 15.

The body 15 of the valve V is fashioned to cooperatively carry the valve parts which control the supply of water to the cup. Functionally, it is desired that the cup be automatically and quick filled to ½ or ¾ its height when fluid pressure is initially supplied to the system, and that only the fowl in drinking therefrom reduce that level before the cup is again refilled. And, these functions are automatic and inherent in the valve V which involves, generally, a valve seat 20, a valve pin 30, a valve seal 40, a baffle 50, and an actuator body 55. The assembly of parts which forms the valve V is characterized by the valve pin 30 extending loosely through the body 15 and thereby capturing the seal 40 and baffle 50 in operating position relative to the body. The actuator body 55 is applied onto the valve pin 40 in a manner to hold the valve parts in the assembled condition.

The body 15, as hereinabove described, is a cylindrical part that is threaded into the manifold A to clamp the cup in operative position. Further, the body 15 functions as a duct for delivery of water from the manifold into the cup, and to this end has an opening therethrough. As shown, the opening through said body comprises an enlarged cylindrical chamber 18 of substantially greater cross-section than the valve part that operates therein, and so that said part is free to move laterally therein. In practice, the chamber 18 is established as by drilling on an axis concentric with the body 15. In accordance with the invention the valve seat 20 is formed as by the angular leading cutting edges of a drill, preferably disposed at a 30° angle extending inwardly to a central discharge port 19 that opens at the top 21 of the body. Again, the port 19 is of such diameter as to pass the valve part extending therethrough with substantial clearance, and the annular valve seat 20 immediately underlies the top 21 and adjoins said top at the relatively sharp corner or minimum radius, as shown. Also, the top 21 is a flat smooth surface disposed in a plane normal to the longitudinal axis of the body 15.

The valve pin 30 is a straight shaft-like part adapted to enter into the cylindrical chamber 18 from above the top 21, to be operated by the actuator body 55 and to operate the valve seal 40 relative to the valve seat 20.

The valve seat 20 faces downwardly at the top of the chamber 18 while the valve pin 30 depends into the chamber through the port 19, where it has an annular shoulder 29 that opposes the seat 20. That is, the outer diameter of the shoulder 29 is substantially greater than the inner diameter of the port 19. Thus, the valve pin 30 presents a straight and upstanding shaft-like part that normally extended along the axis of the body 15 projecting through the port 19 with clearance so as to permit a rocking movement to be described.

The valve seal 40 is an annular part that surrounds the valve pin 30 and is captured in working position between the valve seat 20 and shoulder 29. In accordance with the invention the valve seal 40 and valve pin 30 are biased against the valve seat 20 entirely by water pressure within the chamber 18, and in order to have sealing engagement the seal has a rim that has circular engagement with the said seat 20. In its preferred form the seal 40 is an O-ring that closely and/or frictionally surrounds the valve pin 30 to be carried with the pin in engagement with the shoulder 29. Thus, the sealing rim is the outer and upper quarter peripheral face of said O-ring. In accordance with the invention, the outer diameter of the valve seal 40 is substantially smaller than the inner diameter of chamber 18 surrounding the valve seat 20, in order to establish a flow restricting passage of annular configuration. And, as a result of the valve seat and valve seal closeness hereinabove described there is a lifting and centering action as water expells upwardly through the annular oriface existing between the valve seat 20 and valve pin 30, as well as a centering action when the valve seal 40 engages on the cone-shaped valve seat 20. As a result, the valve pin 30 is biased and centered as and when water pressure is applied.

The baffle 50 is a plate-like part that slips over the valve pin 30 to overlie the top 21 of the body 15. In practice, the baffle 50 is a disc of plastic material adapted to seal with the top 21 when engaged therewith and to diffuse water discharged when valve V is opened. To this end the baffle 50 has a downwardly disposed peripheral lip 51 that engages the top 21 along a line of contact circumscribing the port 19. In practice, the said slip fit permits the baffle 50 to drop freely onto the top 21, and alternately to lift off the top when flow of water occurs. Normally, however, the baffle drops by gravity and engages the top 21 so as to preclude the downward precipitation of particles to the port 19.

The actuator-float X is provided to pivot and/or to lift the valve pin 30 and valve seal 40 carried thereby, the fulcrum of said pivotable movement being the peripheral engagement of seal 40 on the valve seat 20. The actuator-float X is coaxially affixed to the valve pin 30 and is adapted to cause axial and radial displacements of said valve pin, and involves a head 56 affixed to the upper end of the valve pin 30, an actuator flange 62 to be pecked at and/or nudged laterally so as to cause momentary misalignment of the valve pin, and a float 55 carried by the valve pin 30 to close the valve V when the waterer cup is filled (see FIG. 2). In the form of the invention shown in FIGS. 1-4, the head 56 is pressed onto the upper portion of the valve pin 30 and carries an extensive actuator flange 57 that overlies and protects the entire valve V. The actuator flange 57 is a disc that is normally disposed in a plane parallel to the top 21 and with its periphery terminating substantially short of and concentric with the wall 13 of the cup. As shown, the head 56 is provided with a blind bore 58 pressed onto the valve pin 30 so as to have a stopped location thereon, and the actuator flange 57 is a separate part snapped into a groove formed externally in the head 56.

In accordance with this invention I provide a float 55 which is combined with the actuator flange 57 to provide for the dual functions of valve operation by the fowl to admit water and float operation to stop water admission. The first mentioned operation by the fowl is permitted by substantial lateral clearances, while the second mentioned floatation operation is permitted by the substantial longitudinal clearances (see FIGS. 3 and 5). The latter floatation operation is automatic with the provision of the float 55 which is an inverted cup-shaped body, preferably of hemispherical domed configuration having inner and outer diameter walls 60 and 61 terminating at a peripheral and radially extended flange 62 at its mediam plane. Thus, the float body is open at its lower median plane which is normally horizontal but tipped when the valve V is operated to open or when water pressure is relaxed. As shown, the float 55 is provided with an annular groove 63 to receive the periphery of the actuator flange 57 which snaps therein by forcing the parts together and deflecting the float so as to stretch it over the flange. The actuator flange 57 is segmented into separated spokes for facilitating assembly, there being openings and therethrough into the domed float chamber. The external flange 62 is complementary to the perimeter of actuator flange 57 and is engageable by the fowl (pecked at) to be moved laterally and thereby open the valve.

Referring now to FIG. 5 of the drawings and to the second form of the invention, the actuator-float X' is essentially the same as the first form hereinabove described and involves a head 156 affixed to the upper end of the valve pin 30, and a float 155 carried by the valve pin 30 to close the valve V when the waterer cup is filled. In this preferred form of the invention the previously described actuator flange 57 is eliminated and the float 155 can be directly applied to the valve pin 30. In practice, however, the head 156 is employed with its blind bore 158 for location, and a thin-walled tubular extension 154 depends from the float 155 with a press fit onto the head 156. The float has an actuator flange 157 at its lower periphery and the entire bottom of the float chamber remains open.

The check valve filter F provides protective functions which enable the shut-off valve V to be reliable in its operation. The check valve filter F involves the body 15 and establishes a releasable closure for the cylindrical chamber 18 therein, in open communication within the pipe of manifold A. In accordance with the invention, the check valve filter F involves but two parts, a movable poppet 60 and a fixed retainer 70. The poppet 60 is reciprocably operative as a result of water flow through the chamber 18 and when seated upon the retainer 70 water is entrapped within the said chamber. It is the cylindrical chamber 18 in which the poppet 60 is operable to be lifted by the dynamics of liquid flow and to be returned to a seated position by gravity when conditions are static.

From the foregoing it will be apparent that a very practical arrangement of few and simple parts characterizes the present invention. The waterer units B are automatically filled when sufficient water pressure is initially applied so as to close the valve V by the application of fluid flow. Each waterer unit is independently operable in establishing its own plentiful water level to automatically fill and to maintain the same approximate level. Normally, the shut-off valve V closes the upper end of chamber 18 and thereby stops the delivery of water therethrough and so that the poppet 60 drops onto the retainer seat 72. As a result, a body of water is entrapped within the chamber 18 and isolated from both the source within manifold A and from the supply delivered into the waterer cup. The reciprocal movement and misalignment of the filter rod 65 has its function of scrubbing away any collection of foreign materials, while its poppet valve action is operative with the shut-off valve V to create an entrapped body of water with the consequent isolation of the waterer cup unit B from the supply manifold A. Despite the normal operation of the waterer herein disclosed, there are circumstances which prevent closing of the shut-off valve V, and a best example is low or insufficient water pressure in manifold A. Thus, the actuator float X and X' has its decided advantages in assuring a shut-off of water when the level thereof reaches a predetermined point in each waterer. The actuator-float is of the simpliest presson and open construction in each embodiment and inherently establishes an air chamber or bubble as the water level rises regardless of the water pressure involved and rapidity of filling.

Having described only typical preferred forms and applications of my invention, I do not wish to be limited or restricted to the specific details herein set forth, but wish to reserve to myself any modifications or variations that may appear to those skilled in the art.

I claim:

1. A waterer unit responsive to the level of water dispensed therein from a pressured supply thereof and comprising, an upwardly open vessel having a side wall of substantial vertical extent for the containment of a water level therein, a valve body with a chamber therethrough opening into the water supply and into the vessel, a downwardly faced valve seat in said chamber surrounding the opening thereof into the vessel, a shut-off valve with an axially and angularly displaceable pin projecting freely through said seat and said valve normally engaging the valve seat and operable therefrom by axial as well as by angular displacements so as to increase the water level in said vessel, and an actuator-float affixed to the said valve pin within the confines of the vessel side wall and comprising a hollowed downwardly open body adapted to entrap air and operable by floatation to lift and close the shut-off valve when the water level rises therein and with a tubular extension projecting centrally thereof and attached to and closed by a head carried by the valve pin forming a floatation chamber and with a flange at the perimeter of the hollowed body and operable through engagement by axial as well as by lateral-angular displacement to increase the water level therein.

* * * * *